United States Patent [19]

Edlund

[11] Patent Number: 5,121,822
[45] Date of Patent: Jun. 16, 1992

[54] CENTRIFUGAL CLUTCH

[75] Inventor: Dag H. Edlund, Huskvarna, Sweden

[73] Assignee: Aktiebolaget Electrolux, Stockholm, Sweden

[21] Appl. No.: 720,636

[22] Filed: Jun. 25, 1991

[30] Foreign Application Priority Data

Aug. 20, 1990 [SE] Sweden ................... 9002690

[51] Int. Cl.⁵ ............................................... F16D 43/18
[52] U.S. Cl. ........................... 192/105 BA; 192/103 B
[58] Field of Search ...... 192/103 B, 105 BA, 105 CD, 192/76

[56] References Cited

U.S. PATENT DOCUMENTS

| 2,022,071 | 11/1935 | Barton | 192/103 B |
| 2,778,469 | 1/1957 | McIntyre | 192/105 BA |
| 3,367,465 | 2/1968 | Newman | 192/105 BA |
| 3,610,382 | 10/1971 | Makinson | 192/105 BA |
| 3,696,901 | 10/1972 | Henry | 192/105 BA |
| 3,938,633 | 2/1976 | Dietzsch et al. | 192/105 BA X |
| 4,832,165 | 5/1989 | Nishimura et al. | 192/105 BA X |

FOREIGN PATENT DOCUMENTS 61-140625  6/1986  Japan ................... 192/105 BA

*Primary Examiner*—Rodney H. Bonck
*Assistant Examiner*—Andrea Pitts
*Attorney, Agent, or Firm*—Pearne, Gordon, McCoy & Granger

[57] ABSTRACT

The invention relates to a centrifugal clutch with coupling jaws and pressure spring. Usually tension springs are used for the type of couplings which have three jaws. Tension springs have a weak point in their attachment lugs that are in most cases exposed to harder stress than the rest of the spring body. Likewise, the lugs get often indication of fracture during the manufacture of owing to wear. The present proposal aims at getting a higher security against spring breaks by using pressure springs. It is characterized by hole spaces (18,19,29) in jaws (13) and spoke plates (14,15) and by supporting bridges (23) between the spoke plates.

3 Claims, 1 Drawing Sheet

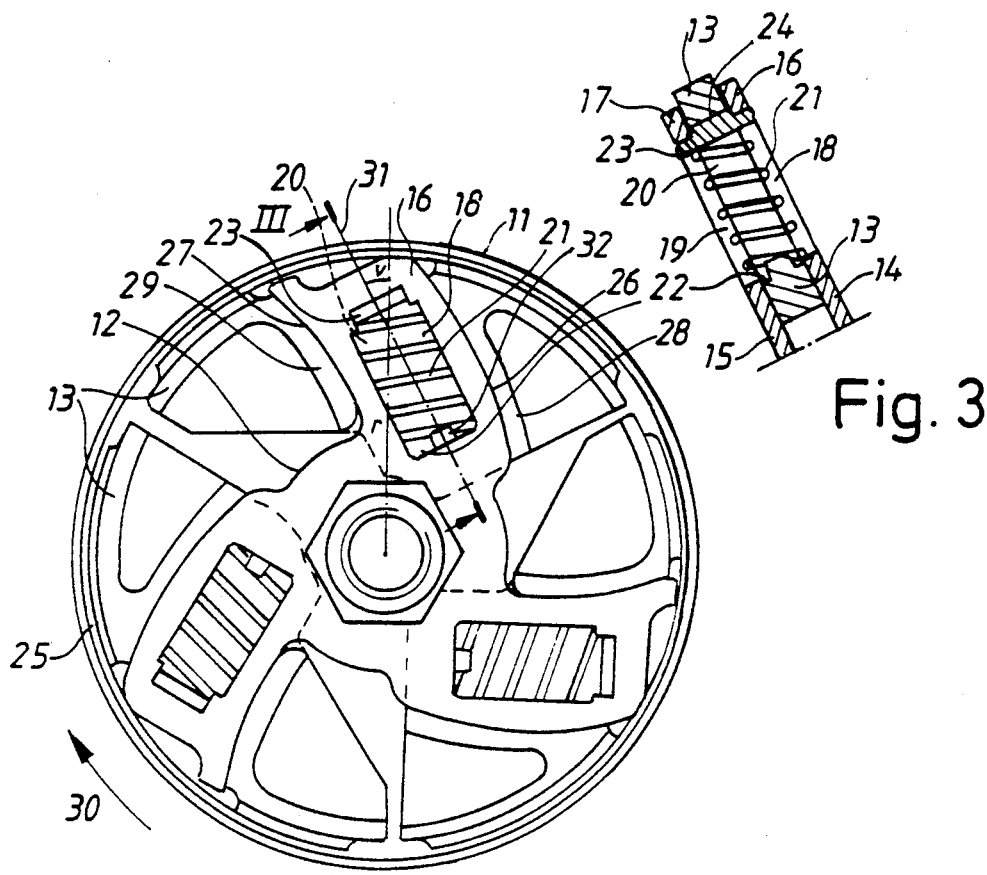
Fig. 3
Fig. 1
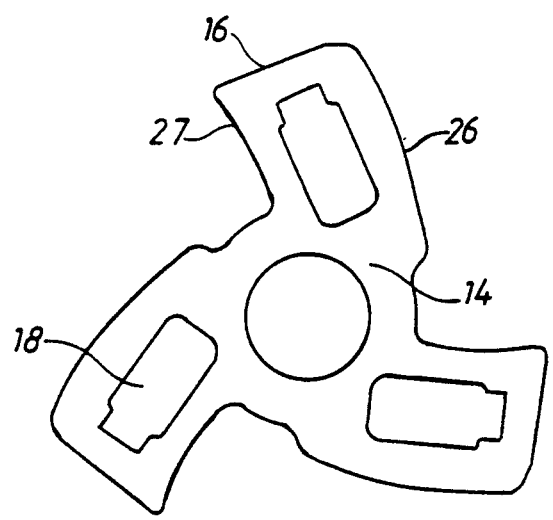
Fig. 2

CENTRIFUGAL CLUTCH

BACKGROUND OF THE INVENTION

The present invention relates to a centrifugal clutch between a driving and a driven axle to be used in e.g. a chain saw.

A centrifugal clutch includes a coupling drum, jaws put into a coupling center and springs holding the jaws elastically in a disconneted position when the coupling is non-operating. Up to now the springs of the centrifugal clutches consist of tension springs actuating the jaws towards the center so that the drum is kept free from the coupling center. The ends of the tension springs are fastened to the jaws and to the coupling center, which ends then are exposed to hard stress and therefore might break. A broken spring causes the coupling to not function as intended, e.g. the property of engagement at a determined r.p.m. will disappear.

SUMMARY OF THE INVENTION

One possibility to obtain safety against string break is to replace the tension springs with pressure springs which do not have sensitive attachments like the tension springs.

By the present invention the proposal of using pressure springs in a centrifugal clutch has been realized in an advantageous shaping of the coupling center in which the springs are enclosed. Such an centrifugal clutch has a better function security and power transmitting ability than the former ones. The properties are evident from the characterizing part of claim 1.

BRIEF DESCRIPTION OF THE DRAWINGS

An embodiment of the centrifugal clutch according to the invention is described in the following with reference to the attached drawing showing in FIG. 1 a centrifugal clutch according to the invention in upright projection, FIG. 2 a spoke plate to the coupling center in the coupling, FIG. 3 a section through a spoke in the coupling center.

DETAILED DESCRIPTION OF THE PREFERRED EMBODIMENT

The two main parts of the centrifugal clutch, the coupling drum 11 and the coupling center 12, are shown in FIG. 1, the drum in the shape of a bowl in the bottom of which (hidden in FIG. 1) a hole for a shaft has been made, which shaft will be driven by the clutch. The center consists of a rotor which drives, when rotating, the drum thanks to the jaws 13 in the center. When rotating the jaws are exposed to a centrifugal force lifting out each jaw towards the drum so that they make contact with the inside of the drum.

The jaws are held in place between a couple of spoke plates 14, 15 (FIGS. 2 and 3), spokes 16, 17 of which show rectangular recesses 18, 19. In the jaws there are also such recesses 20 that coincide with those of the spokes (FIG. 3). In each of the recesses 18, 19, 20 there is a pressure spring 21 which presses against a short side 22 of the recess in the jaw and also against a supporting bridge 23 at the end of the recesses of the spokes 18, 19. By influence of the pressure of the springs against the recesses of the jaws, the other short ends 24 of those recesses rests against the exterior sides of the supporting bridges. The jaws then show a small play 25 in relation to the inside of the drum which is thus disconnected from the coupling center.

The spokes have also supporting edges 26, 27 for the jaws which are provided with ribs 28, 29 that make contact against thoses edges. Herewith, a rotation power can be transmitted from the spoke to the jaw in the direction shown by the arrow 30. Furthermore, the power is transmitted to the drum when the jaws are pressed out towards the drum by centrifugal force. The jaw is moved through the little play 25 along a line 31 constituting an angle v against the radius r. Thanks to this angle a certain wedge action arises at the jaw between the spoke plate and the drum, and this action strengthens the friction against the drum and increases thereby the transferable power in the coupling.

The shaping of the recesses can be adapted to the choice of spring type. The helical pressure spring illustrated in the drawing is such a choice. Other shapes are conic, concave or convex coiling dependent on what characteristics the coupling should have with regard to the engaging r.p.m. and the transmitted power as well as the size of the available spacing. Diaphragm springs in a pack are also a possibility.

An advantegous way of fitting the shown coupling center will probably be the successive assembling of the parts starting at one of the spoke plates, insertion of the jaws on that plate together with the springs and the supporting bridges, and, finally, positioning of the other spoke plate on a top. After that, a shaft is entered into the hole and nuts are tightened round the center. The springs had better have a somewhat larger diameter than the width of the recesses 18, 19 of the plates which hold, in such a way, the springs in their positions.

In case the center is made of spoke plates attached to each other, the recess in the spoke plate can be made large enough to allow the spring to be inserted through the recess hole. In order to hold the springs, a knob 32 is used on the short side 22 of the recess in the jaw. At the other end the spring is held in place through the fact that the recesses in the spoke plates have a smaller width than the diameter of the spring in the area next to the position of the supporting bridges. When assembling, the springs are pressed together to the length needed for passing into the holding means. In such spoke plates a piece of the plate in the center of each spoke can remain when punching the recess and it is bent into the recess where it serves as a supporting bridge 23. Such variations are considered included in the inventive idea which is defined in the following claims.

I claim:

1. Centrifugal clutch with a coupling center (12) and a coupling drum, said cnter including a central coupling piece and circular segment-shaped jaws (13), said jaws being united with the coupling piece by means of connecting parts (28, 29) and an elastic pressure device (21) inserted in an interspace between the connecting parts and spokes (16, 17) provided by the central coupling piece, wherein each connecting part has a long narrow recess (20) which extends along the elastic pressure device, a bridge is provided which crosses said recess and rests in similar recesses provided by the spokes, said bridge constituting one seat of the elastic pressure device, an other seat thereof being located at the opposite end (22) of the recess in the connecting part.

2. Centrifugal clutch according to claim 1, wherein an operating direction of the elastic pressure device forms an angle v>0 to an intersection of a radius r from the coupling center with an outer end of the elastic pressure device.

3. Centrifugal clutch according to claim 2, wherein two parallel spokes provide recesses having center lines parallel with the operating direction of the elastic pressure device.

* * * * *